US009858426B2

(12) United States Patent
Freudiger et al.

(10) Patent No.: US 9,858,426 B2
(45) Date of Patent: Jan. 2, 2018

(54) COMPUTER-IMPLEMENTED SYSTEM AND METHOD FOR AUTOMATICALLY IDENTIFYING ATTRIBUTES FOR ANONYMIZATION

(71) Applicant: Palo Alto Research Center Incorporated, Palo Alto, CA (US)

(72) Inventors: Julien Freudiger, Mountain View, CA (US); Shantanu Rane, Menlo Park, CA (US); Alejandro E. Brito, Mountain View, CA (US); Ersin Uzun, Campbell, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 101 days.

(21) Appl. No.: 14/931,802

(22) Filed: Nov. 3, 2015

(65) Prior Publication Data

US 2017/0124336 A1    May 4, 2017

(51) Int. Cl.
| | | |
|---|---|---|
| *G06F 21/00* | (2013.01) | |
| *G06F 21/60* | (2013.01) | |
| *G06F 21/62* | (2013.01) | |
| *H04L 29/06* | (2006.01) | |
| *G06F 17/27* | (2006.01) | |
| *G06F 17/30* | (2006.01) | |
| *G06Q 10/00* | (2012.01) | |

(52) U.S. Cl.
CPC ........ *G06F 21/602* (2013.01); *G06F 17/2735* (2013.01); *G06F 17/30312* (2013.01); *G06F 21/6254* (2013.01); *G06Q 10/00* (2013.01); *H04L 63/105* (2013.01)

(58) Field of Classification Search
CPC .... G06F 21/60; G06F 21/6227; G06F 21/602; G06F 21/6254; G06F 21/30312; H04L 63/105
USPC .................... 713/165, 166, 189, 193; 726/26
See application file for complete search history.

(56) References Cited

U.S. PATENT DOCUMENTS

| | | | | |
|---|---|---|---|---|
| 6,963,980 B1 * | 11/2005 | Mattsson | ............ | G06F 21/6227 713/193 |
| 7,673,153 B1 * | 3/2010 | Oishi | ............... | G11B 20/00507 711/163 |
| 7,992,010 B2 * | 8/2011 | Dettinger | ............ | H04L 63/0428 713/189 |
| 8,677,148 B2 * | 3/2014 | O'Hare | ............... | H04L 63/0428 713/189 |
| 9,087,215 B2 * | 7/2015 | LaFever | .............. | G06F 21/6254 |

(Continued)

OTHER PUBLICATIONS

P. Ohm. Broken promises of privacy: Responding to the surprising failure of anonymization. UCLA Law Review, 2010.

(Continued)

*Primary Examiner* — Hosuk Song
(74) *Attorney, Agent, or Firm* — Patrick J. S. Inouye; Krista A. Wittman (57) ABSTRACT

A computer-implemented system and method for automatically identifying attributes for anonymization is provided. A dataset of attributes is accessed. Each attribute in the dataset is associated with a plurality of values. The values of the dataset are encrypted and the attributes are processed by assigning a sensitivity level to each of the attributes. One or more of the attributes are selected from the dataset for anonymization based on the assigned sensitivity levels.

16 Claims, 8 Drawing Sheets

(56) References Cited

U.S. PATENT DOCUMENTS 9,495,555 B2* 11/2016 Spalka ................ G06F 21/6218
2014/0189777 A1* 7/2014 Viswanathan ........ H04L 63/105
726/1

OTHER PUBLICATIONS

F.D.McSherry. Privacy integrated queries: an extensible platform for privacy-preserving data analysis. SIGMOD, 2009.
C. Dwork. Differential privacy Automata, languages and programming, 2006.
L. Sweeney. K-anonymity: A model for protecting privacy. International Journal of Uncertainty, Fuzziness and Knowledge-Based Systems, 2002.

* cited by examiner

COMPUTER-IMPLEMENTED SYSTEM AND METHOD FOR AUTOMATICALLY IDENTIFYING ATTRIBUTES FOR ANONYMIZATION

FIELD

This application relates in general to anonymizing data, and in particular to a computer-implemented system and method for automatically identifying attributes for anonymization.

BACKGROUND

During the normal course of business, companies accumulate large amounts of data. Recently, some companies have begun to monetize this data by sharing their data with third parties, such as advertisers, researchers, or collaborative partners. The third parties pay a certain monetary fee and in exchange, receive relevant data from a data owner. The third party can then use the data to target advertising or conduct research. However, the data requested by the third parties often includes information that is private to one or more individuals from whom the data is collected.

To protect the privacy of individuals from which the data is collected, anonymization of the data can occur prior to being provided to the third party. Data anonymization includes the altering of data to protect sensitive information while maintaining features that allow a requesting third party to use the data. The data altering can include adding noise, reducing precision of the data, or removing parts of the data itself. Generally, data owners do not have enough knowledge regarding anonymization and thus, rely on third parties to identify sensitive information for anonymization, as well as to anonymize their data prior to providing the data to a third party.

One approach to anonymization includes contacting an anonymization service provider that provides individual personnel to help with the data anonymization. The personnel assigned to the anonymization has access to the data despite being an untrusted third party. Currently, many companies ask the anonymization service to sign confidentiality agreements, such as a Memorandum of Understanding or a Non-Disclosure Agreement to protect the data prior to and after the data is anonymized. A further approach includes relying on software applications for anonymization. However, the software must generally be given full access to the data and security concerns still arise. Further, most software usually requires the data owner to specify which data attributes should be anonymized, as well identify the anonymization parameters. Unfortunately, most data owners lack the knowledge and expertise to accurately identify which attributes require anonymization and the level of anonymization necessary to prevent the identity of an individual from being disclosed. Thus, a technical problem exists in which data to be analyzed for anonymization must be disclosed either to an individual or software prior to determining whether the data need be anonymized, which can allow sensitive information to be discovered by an untrusted party.

Therefore, there is a need for an approach to automating data anonymization, including identifying specific data attributes for anonymization, to prevent data disclosure or breach and ensure data protection.

SUMMARY

To assist companies in identifying sensitive information for anonymization, while preventing disclosure of the information, an anonymizer can blindly analyze the data and identify which data items should be anonymized. Specifically, a data set for analysis can be encrypted and provided from a data owner to the anonymizer for processing. The anonymizer can determine which attributes within the dataset should be anonymized and a level of anonymization needed. The identified attributes can then be provided to the data owner for confirmation of the attributes. Once approved by the data owner, the anonymizer anonymizes the data values for each attribute.

An embodiment provides a computer-implemented system and method for automatically identifying attributes for anonymization. A dataset of attributes is accessed. Each attribute in the dataset is associated with a plurality of values. The values of the dataset are encrypted and the attributes are processed by assigning a sensitivity level to each of the attributes. One or more of the attributes are selected from the dataset for anonymization based on the assigned sensitivity levels.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Companies and institutions that collect large amounts of data in the regular course of business can now monetize their data by anonymizing the data and providing the data to other companies and institutions for research, such as market research or medical research. However, some of the data may be considered sensitive or is federally regulated to ensure that the data is protected and an identity of the individual to whom the data refers remains confidential. Data collections that include sensitive information or are federally regulated must be anonymized to prevent access to the data. Currently, many companies do not have the experience or expertise in identifying which data needs to be anonymized and how much anonymization is necessary to prevent a third party from identifying an individual associated with the data. To protect sensitive information and prevent disclosure of the data, the information can be encrypted and an automatic determination of anonymization can be made.

Figure 1:
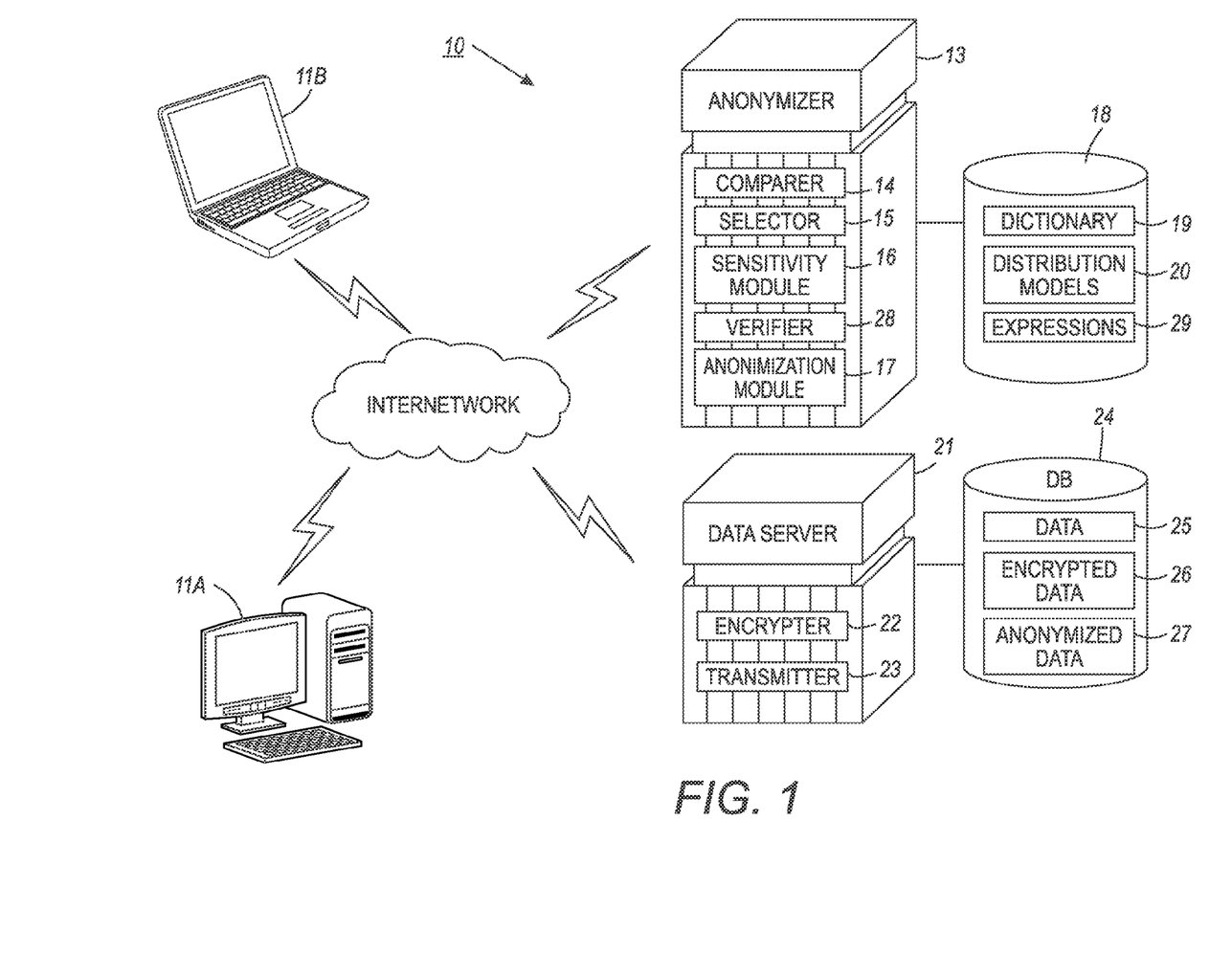
FIG. 1 is a block diagram showing a computer-implemented system for automatically identifying attributes for anonymization, in accordance with one embodiment.

Automatic anonymization can occur via an anonymizer that blindly processes encrypted data. FIG. 1 is a block diagram showing a computer-implemented system for automatically identifying attributes for anonymization, in accordance with one embodiment. A data owner maintains large amounts of data 25 collected over time. The data 25 can be stored in a database 24 interconnected to a trusted server 21 located at the data owner's place of business or remotely. Alternatively, the data 25 can be stored in the cloud, including in pools on multiple servers. The data owner can access the data 25 via a desktop 11a or laptop 11b computer, or via other types of computing devices, such as a mobile computing device (not shown). The stored data 25 can include one or more data sets 25 each associated with a plurality of attributes. Further, each attribute is associated with data values for a group of individuals.

The trusted server 21 includes an encrypter 22 and a transmitter 23. Data 25 that the data owner wants to provide to a third party, such as in exchange for money, can be encrypted 25 via the encrypter 19 and the transmitter 23 can send the encrypted data 26 to an anonymizer 13. The anonymizer 13 can be trusted or untrusted, and is interconnected to the trusted data server 21 via an internetwork 12, such as the Internet or a specialized network. The anonymizer 13 can include a comparer 14, a selector 15, a sensitivity assignment module 28, a verifier 16, and an anonymization module 17.

During processing of a dataset by the anonymizer, the comparer 14 compares the attributes of the dataset with either a dictionary 19 for an associated array of strings that refer to quasi-identifiers, distribution models 20, or regular expressions 29. During the comparison, the sensitivity module 16 assigns a sensitivity value to each attribute and can identify one or more attributes as sensitive based on the assigned sensitivity values. The sensitivity value reflects an amount of anonymization needed to ensure that data is masked strongly enough to prevent identification of the corresponding individual. For instance, attributes that are more sensitive must be more strongly anonymized than attributes that are less sensitive. Anonymization alters the data to protect the sensitive information, such as by adding noise, reducing precision of the data, or by removing some of the data. Subsequently, the anonymizing module 17 anonymizes the sensitive attributes based on the sensitivity levels. The anonymized data 27 is then transmitted back to the data owner for providing to a third party.

The computing devices and servers can each include a central processing unit, random access memory (RAM), input/output ports, non-volatile secondary storage, such as a hard drive or CD ROM drive, network interfaces, peripheral devices, including user interfacing means, such as a keyboard and display, and one or more modules for carrying out the embodiments disclosed therein. Program code, including software programs, and data are loaded into the RAM for execution and processing by the CPU and results are generated for display, output, transmittal, or storage.

The modules can be implemented as a computer program or procedure written as source code in a conventional programming language and is presented for execution by the central processing unit as object or byte code. Alternatively, the modules could also be implemented in hardware, either as integrated circuitry or burned into read-only memory components, and each of the computing devices and server can act as a specialized computer. For instance, when the modules are implemented as hardware, that particular hardware is specialized to perform message prioritization and other computers cannot be used. Additionally, when the modules are burned into read-only memory components, the computing device or server storing the read-only memory becomes specialized to perform the message prioritization that other computers cannot. Other types of specialized computers are possible. Further, the management system can be limited to specific clients and specific hardware on which the management system is implemented, as well as limited by a subscription service to only subscribing clients. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
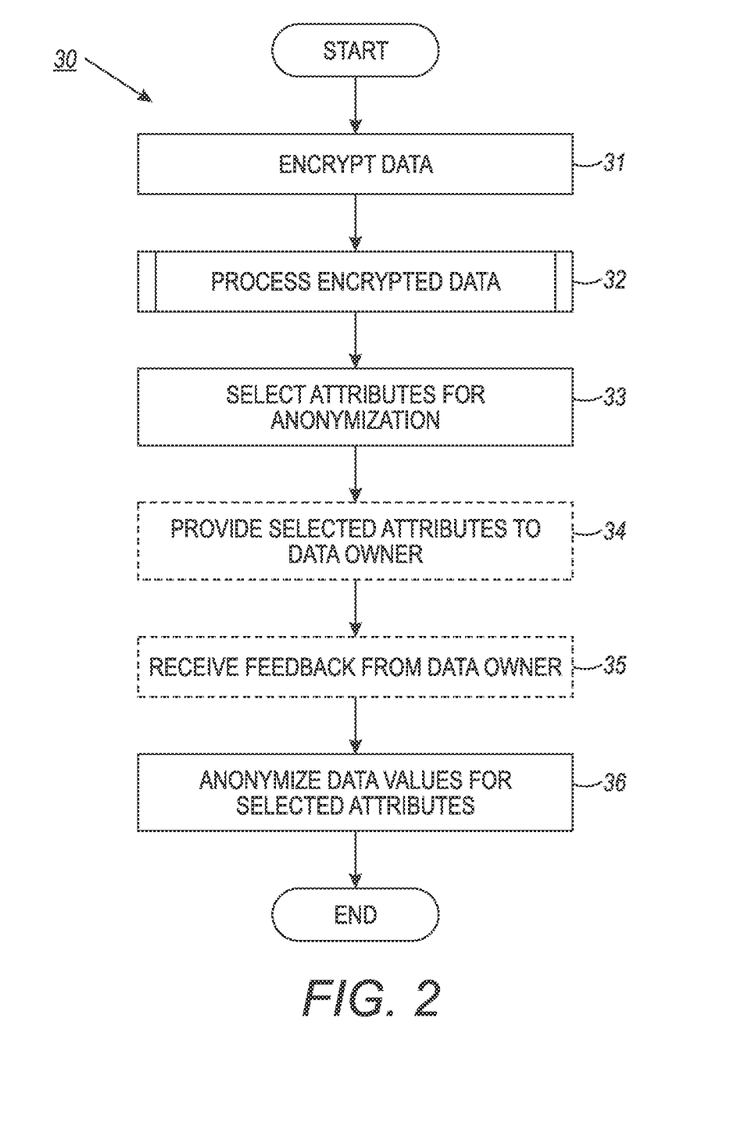
FIG. 2 is a flow diagram showing a computer-implemented method for identifying attributes for anonymization, in accordance with one embodiment.

Determining a sensitivity level for each attribute, allows the anonymizer to identify one or more attributes for anonymization and a level of anonymization necessary. FIG. 2 is a flow diagram showing a computer-implemented method for automatically identifying attributes for anonymization, in accordance with one embodiment. A data owner identifies a dataset for potential anonymization. The dataset can include attributes, such as name, social security number, address, telephone number, medical condition, and account number, and data values for each attribute, for one or more individuals. For instance the attribute for zip code can include a value of 98125 for a first individual, located in north Seattle, and a value of 98101 for a second individual located in downtown Seattle. Other attributes and data values are possible.

The data values can be encrypted (block 31) for each of the attributes and then, the encrypted data values are transmitted to an anonymizer for processing (block 32). In a further embodiment, the attributes themselves are also encrypted. The encryption can occur using a deterministic symmetric key encryption scheme, such as Advanced Encryption Standard (AES) in CBC mode or using order-preserving encryption. During order-preserving encryption, the data values are run through a pseudo random generator that assigns encrypted values to each data value while maintaining the order of the non-encrypted data values. Unlike most encryption algorithms, such as AES, order preserving encryption maintains the ordering of plaintext data in their encrypted form.

For example, a plaintext version of the data values include the numbers 0-5. The order of the plaintext data values is maintained upon order preserving encryption to generate ordered ciphertext data values. Specifically, a pseudo-random generator performs pseudo-random mappings of the plaintext values to order-preserving encryption values as ciphertext values. The only criteria for order preserving encryption is that the ordering of the plaintext values and ciphertext values is preserved. In one example, the number 0 is mapped to 457, while 1 is mapped to 473, 2 is mapped to 510, 3 is mapped to 625, 4 is mapped to 635, and 5 is mapped to 1001. Zero is the smallest plaintext data value and the encrypted value of zero, 457, is the smallest ciphertext value of the dataset. Additionally, the plaintext value 5 is the largest, while the encrypted value for 5, 1001, is also the largest. Preserving the order of the encrypted values helps to ensure that the data is still useful for a limited amount of processing and inference despite being encrypted.

During processing of the encrypted dataset, the data values can be analyzed using rule-based classification, statistics-based classification or plaintext sampling, to select (block 33) one or more attributes for anonymization based on an assigned sensitivity value. Under rule-based classification, the attributes of the encrypted data values are compared to various dictionary strings, which are each associated with a sensitivity value. Those attributes with sensitivity values that exceed a predetermined threshold can be identified as sensitive and selected for anonymization. Identifying sensitive attributes via rule-based classification is further identified below with reference to FIG. 3. With regards to statistics-based classification, the data values of each attribute are modeled and compared with distributions of attributes already known to the anonymizer. Subsequently, a measure of divergence between the known distribution and the distribution observed by the anonymizer is determined and compared against to a predetermined threshold to identify one or more sensitive attributes and determine a level of sensitivity for each attribute. Statistics-based determination can be used to confirm the findings of rule-based classification or to identify attributes, such as when the attribute values are themselves encrypted. Statistics-based determination is further described below with reference to FIG. 4.

Finally, under plaintext sampling, a portion of the dataset is provided to the anonymizer prior to encryption. The anonymizer generates a set of expressions for one or more attributes based on the unencrypted data. Subsequently, the rest of the data set is encrypted and compared against the expressions to identify particular attributes and their sensitivities. Plaintext sampling can be used to identify attributes and sensitivity values for the attributes, as further described below with reference to FIG. 8.

Once selected, the attributes can then be optionally provided (block 34) to the data owner for review and verification. Upon review of the selected attributes, the data owner can provide feedback (block 35), including removing one or more of the selected attributes for anonymization, adding one or more attributes, or verifying the selected attributes. Then, the anonymizer anonymizes (block 36) the data values of the selected attributes in accordance with the assigned sensitivity levels. In one embodiment, anonymization can occur as described in U.S. Patent Application Publication No. 2017/0124335, pending, the disclosure of which is hereby incorporated by reference. Other methods for anonymization are possible.

Figure 3:
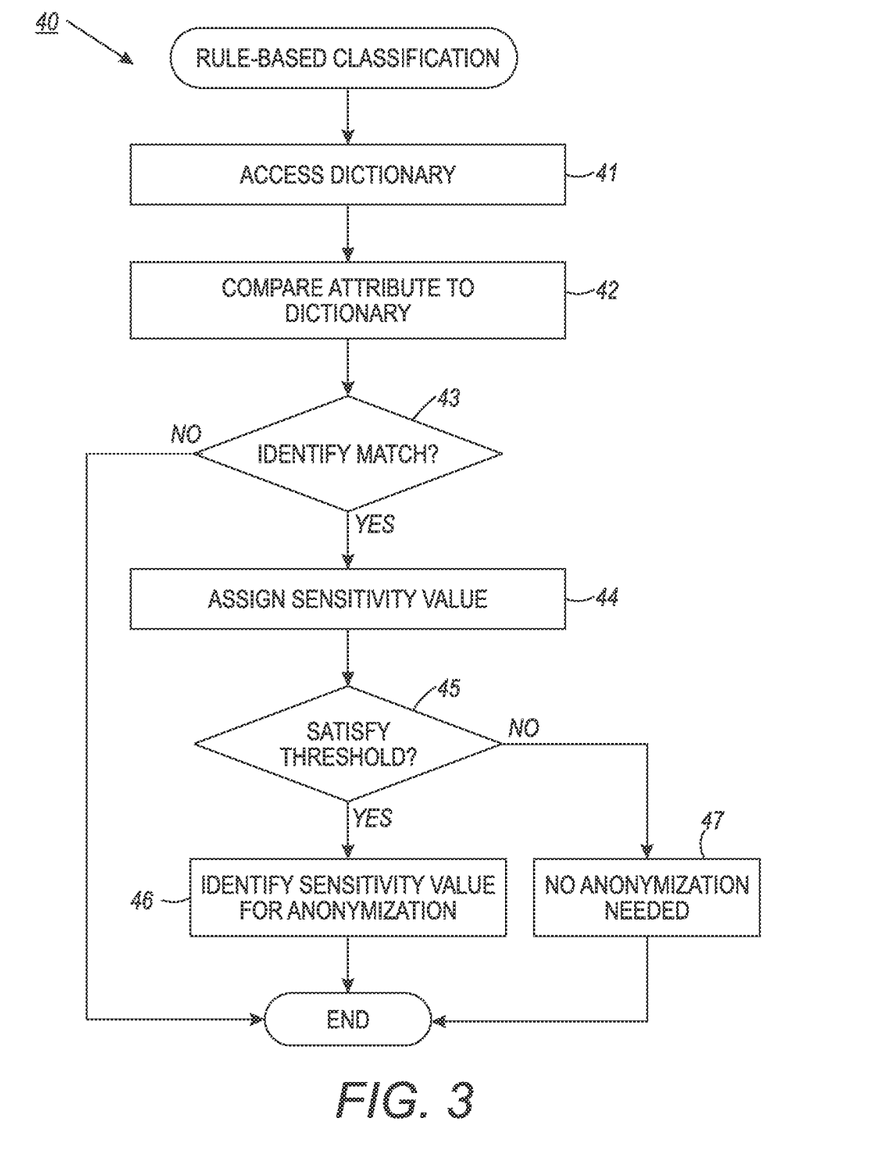
FIG. 3 is a flow diagram showing, by way of example, a process for rule-based classification.

To automatically identify attributes for anonymization, the anonymizer processes a dataset based on past experience. FIG. 3 is a flow diagram showing, by way of example, a process for rule-based classification. The anonymizer receives the encrypted dataset from a data owner, which can include, in one embodiment, unencrypted attributes and encrypted data values, and accesses (block 41) a dictionary of strings that refer to quasi-identifiers, such as known attributes, and sensitivity values. The anonymizer can compile the dictionary of strings based on previous experience analyzing attributes. For example, if the anonymizer has previously identified social security number as being associated with a very high sensitivity, then the sensitivity value in the dictionary will also reflect a high value, or if an attribute, such as age has been generally associated with a lower sensitivity, the sensitivity value will be set accordingly.

Each sensitivity value represents how likely a string includes quasi-identifier or attribute that can be used to identify an individual associated with a data value for that attribute. In one example, the sensitivity values can range from 0 to 1, with higher values representing a higher likelihood the quasi-identifier data value can associate an individual. For instance, the dictionary can include the strings for quasi-identifiers, including social security, location, name, and sensor readings, such as via a heart rate monitor. Social security is associated with a weight of 1.0 since a social security data value will disclose the identity of the individual associated with that particular social security number. In contrast, location is associated with a weight of 0.6, full name is associated with a weight of 1 and a sensor reading is associated with a weight of 0.01.

Other weights are possible, such as 0 to 100 or −1 to 1, as well as other quasi-identifiers, such as medical condition, credit card number, and grades. In a further embodiment, the sensitivity values can be composable, such that the values across all the strings in the dictionary have a total sum of 1 and each sensitivity value is equal to or larger than zero. In yet a further embodiment, the sensitivity values can be interpreted as probabilities, so that the strings in the dictionary, which are representative of an attribute more likely to be anonymized, are associated with a higher sensitivity value than strings associated with attributes less likely to be anonymized. Other types of values for sensitivity are possible.

Each of the attributes in the dataset are then compared (block 42) with the dictionary and one or more matches can be identified (block 43) for each of the attributes. A match can be determined multiple ways, including based on string subset matching or a similarity metric. String matching includes comparing an attribute with each of the dictionary string entries and identifying one or more entries, which includes the attribute or which is included within the attribute. For instance, the attribute "phone number" can be compared with the dictionary entries and one or more entries for "telephone number," "telephone no." or "phone no." can be identified as a match since each of the entries includes the term "phone." String matching can occur via the Naïve string search algorithm or other types of pattern algorithms. To prevent incorrect matches, such as an attribute for "phone number" being matched with a dictionary entry for "social security number" due to the similarity of the term "number," an algorithm can be trained to separate the different phrases. Alternatively, rules for each of the attributes can be applied. For example, a rule for social security number can include three numbers followed by a dash, followed by two numbers, followed by a dash, followed by four numbers. In contrast, a telephone number rule can include three numbers followed by a dash, followed by three numbers, followed by a dash, followed by four numbers.

Further, attribute comparison via a similarity metric includes calculating a measure of similarity between each attribute and each dictionary string. A similarity threshold is defined and applied to each similarity measure to determine which dictionary string is most similar to an attribute. The similarity measures can be determined using cosine similarity, cross-correlation, or log-expression, as well as other similarity metrics. For example, when cosine similarity is used, a vector is generated for each string in the dictionary and each attribute, and a measure of similarity is calculated between the vectors for the attribute and each string. Each vector is determined from a name of the corresponding attribute. For instance, a vector for the candidate attribute "age" includes ["a," "g," "e"]. Once determined, the vector can be used in edit distance calculations to determine how closely the vector matches with vectors for other attributes in the database to be anonymized. The similarity measures are then used to identify which dictionary string matches or most closely matches an attribute. Specifically, a threshold is applied to each similarity measure for an attribute and the dictionary string associated with a similarity measure that exceeds the threshold is identified as a match to the attribute.

Once a matching string has been identified, the weight associated with that string is assigned to the attribute and a predetermined threshold is applied (block 45) to the sensitivity value. If the sensitivity value exceeds the threshold, the attribute is recommended (block 46) for anonymization based on the identified sensitivity. However, if the sensitivity value does not exceed the threshold, a recommendation of no anonymization is provided (block 47). Also, if a match is not identified, another attribute is selected (not shown) until all the attributes in the dataset have been processed.

Alternatively, a need for anonymization and a level of anonymization can be determined based on a range of sensitivity values, rather than just a single threshold. For example, attributes with sensitivity values of 0 to 0.2 need not be anonymized, attributes with weights of 0.3 to 0.5 need a low level of anonymization, attributes with weights from 0.6 to 0.7 need medium anonymization, and attributes with weights from 0.8 to 1 need a highest level of anonymization.

In a further embodiment of rule-based classification, the data owner can provide the anonymizer with a list of attributes and associated sensitivity values, rather than requiring the anonymizer to determine the sensitivity value. Once received, the anonymizer utilizes the sensitivity values to determine a level of anonymization and anonymizes the data values for each attribute according to the determined anonymization level. Specifically, the anonymizer can determine the level of anonymization based on previous anonymization experience or via a threshold. For instance, in one example, the anonymizer can maintain a list of attributes that should be anonymized based on past anonymization of those attributes. Subsequently, the attributes from the data owner that are included in the list can then be anonymized. Alternatively, a threshold can be used to determine whether anonymization of an attribute is necessary. For example, all attributes with a sensitivity value above 0.7 should be anonymized. Also, in lieu of a single threshold, a range of sensitivity values can be used, as described above, to determine whether anonymization is necessary and a level of anonymization that should occur.

Figure 4:
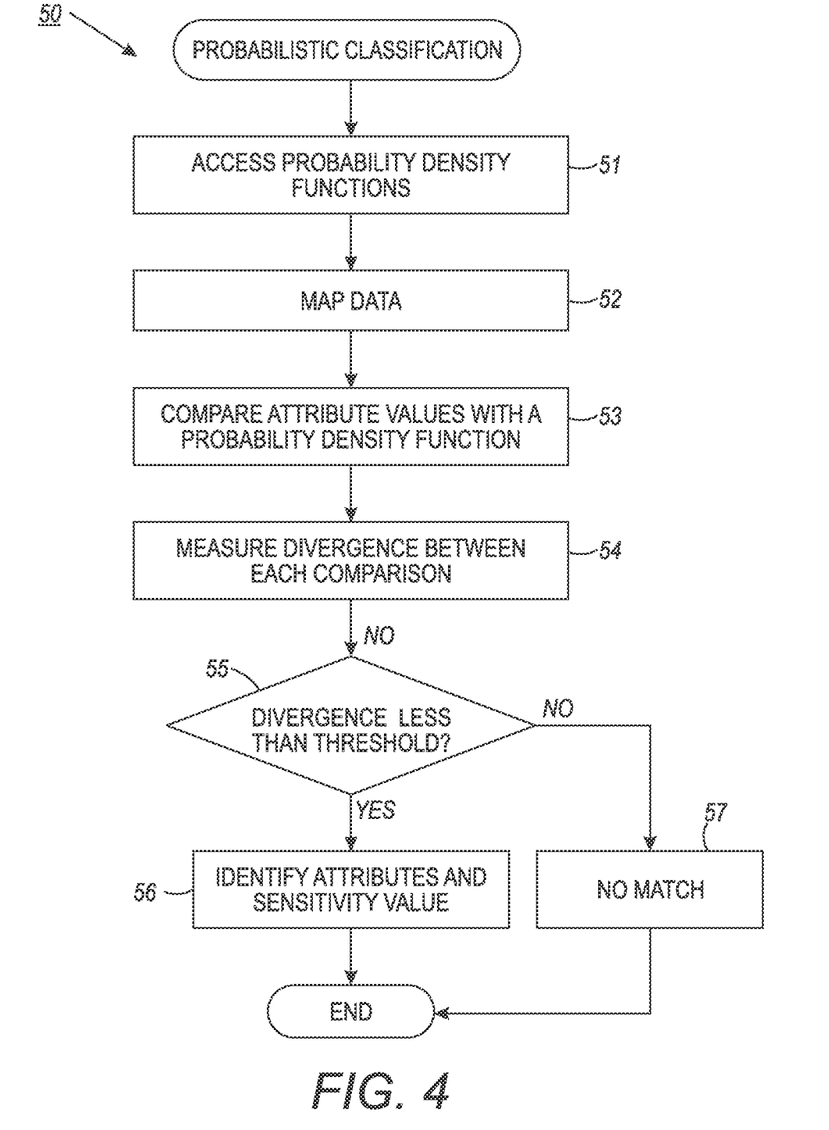
FIG. 4 is a flow diagram showing, by way of example, a process for statistics-based classification.

Upon identifying attributes for anonymization, a list of the attributes can be generated and provided to the data owner for review. In one embodiment, the sensitivity level and corresponding anonymization level can also be provided. Once received, the data owner can confirm, deny, add to, or remove attributes on the list, as well as provide other types of feedback. In response to the data owner's feedback, the anonymizer can revise the list of attributes for anonymization using statistics-based classification. However, in a further embodiment, statistics-based classification can be used in lieu of rule-based classification to identify attributes for anonymization, such as when the attributes themselves are encrypted or even when the attributes are unencrypted. FIG. 4 is a flow diagram showing, by way of example, a process 50 for statistics-based classification. The anonymizer accesses (block 51) probability density functions (PDFs) that each represent known distributions of data values for an attribute and describes a likelihood of a particular data value to represent a given value. Each PDF can be associated with a sensitivity value that indicates a level of anonymization necessary to prevent identification of an individual associated with a data value for that attribute.

Figure 5:
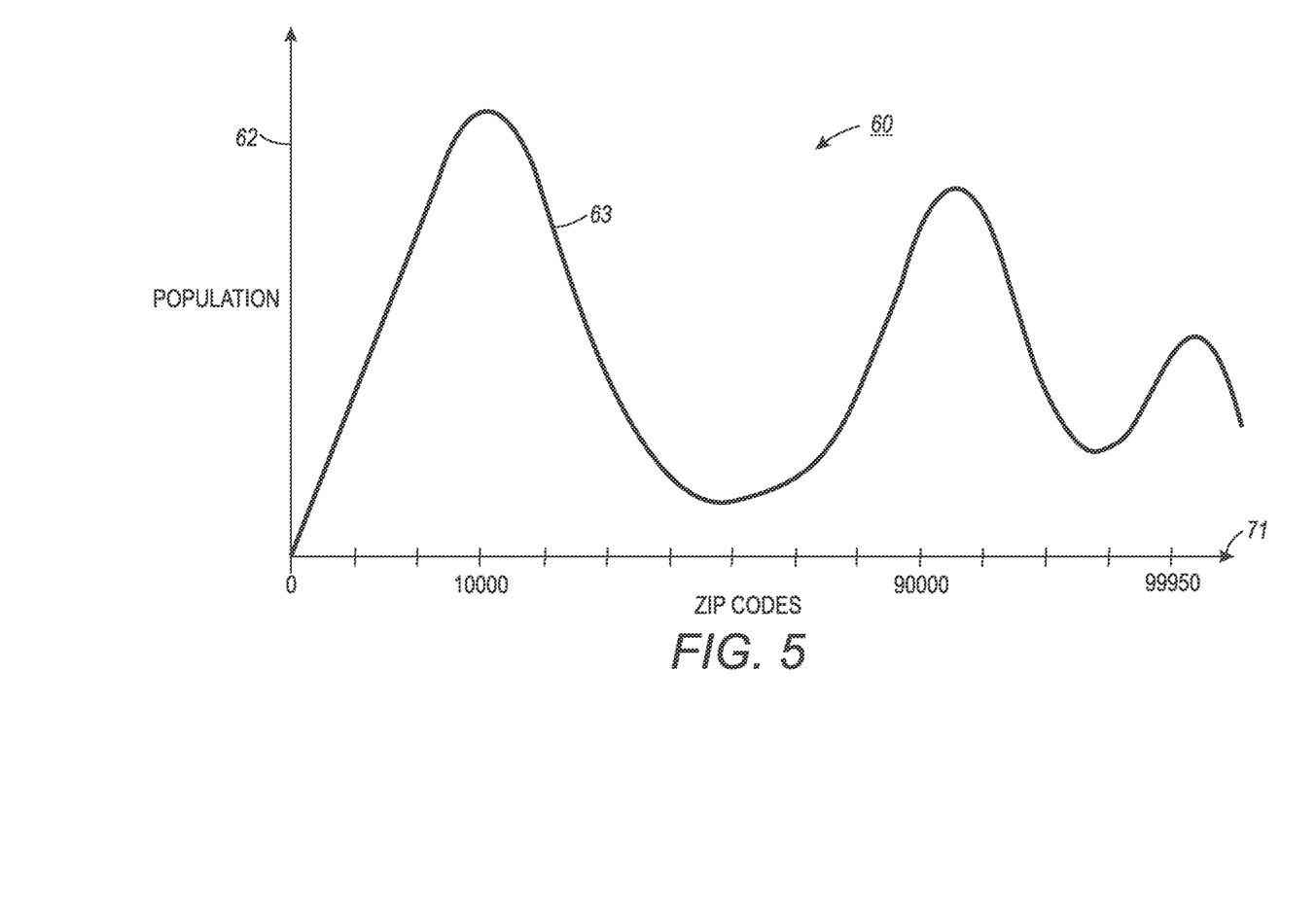
FIG. 5 is a block diagram showing, by way of example, a graph for a distribution of zip codes.

For instance, one or more PDFs can be provided for zip codes, including a distribution for all zip codes in the U.S. and all zip codes for one or more states in the U.S. FIG. 5 is a block diagram showing, by way of example, a graph 60 for a distribution of all zip codes in the U.S. An x-axis 61 of the graph represents all the zip codes in the contiguous U.S., while the y-axis 62 represents a population of each zip code. A function 63 for the zip code distribution is mapped within the axes. The zip codes with the highest populations appear around the 10000 range, which covers portions of the East Coast, and specifically, New York City; the 90000 range, which is covers most of California; and the 95000 range, which covers the Pacific Northwest. Meanwhile, the lowest populated zip codes appear in the mid-west. Generally, zip codes with lower populations are more likely to disclose information about an individual than zip codes with higher populations since more people share the same zip code. Other attributes and graphs are possible. For instance, first or last name can be mapped based on a popularity of the name, salary can be mapped based on age or location, account number can be mapped by geographical region, and telephone number can be based on a location associated with the area code.

Returning to the discussion with respect to FIG. 4, the anonymizer then maps (block 52) a distribution of the data values for each attribute in the dataset. Despite being encrypted, the data values can be mapped based on their encrypted values when order-preserving encryption is used since the ordering of the data is maintained. Each attribute distribution for the dataset is compared (block 53) with each known PDFs. A divergence is measured (block 54) between a dataset attribute and each known PDF to determine whether one of the PDFs matches the distribution for that dataset attribute. The divergence can be measured using Kullback-Leibler divergence, Jensen-Shannon divergence, or variational distance to measure a distance between the distribution of a known PDF and the distribution of a dataset attribute. However, other divergence measures are possible.

Subsequently, a predetermined threshold can be applied to the divergence measure. If the measure of divergence is less than (block 55) the threshold, a high measure of similarity exists and the distributions are considered to be a match. The attribute of the matching PDF is then assigned (block 56) to the encrypted attribute. Additionally, the sensitivity value associated with the matching PDF can also be assigned (block 56) to the encrypted attribute and used to determine a level of anonymization for the data values of the encrypted attribute. However, if the measure of divergence exceeds the threshold, no match (block 57) between the distributions is identified because a high measure of dissimilarity exists. Each attribute in the dataset is compared with all of the known PDFs in an attempt to identify the attribute of the dataset and determine which attributes should be anonymized.

Figure 6:
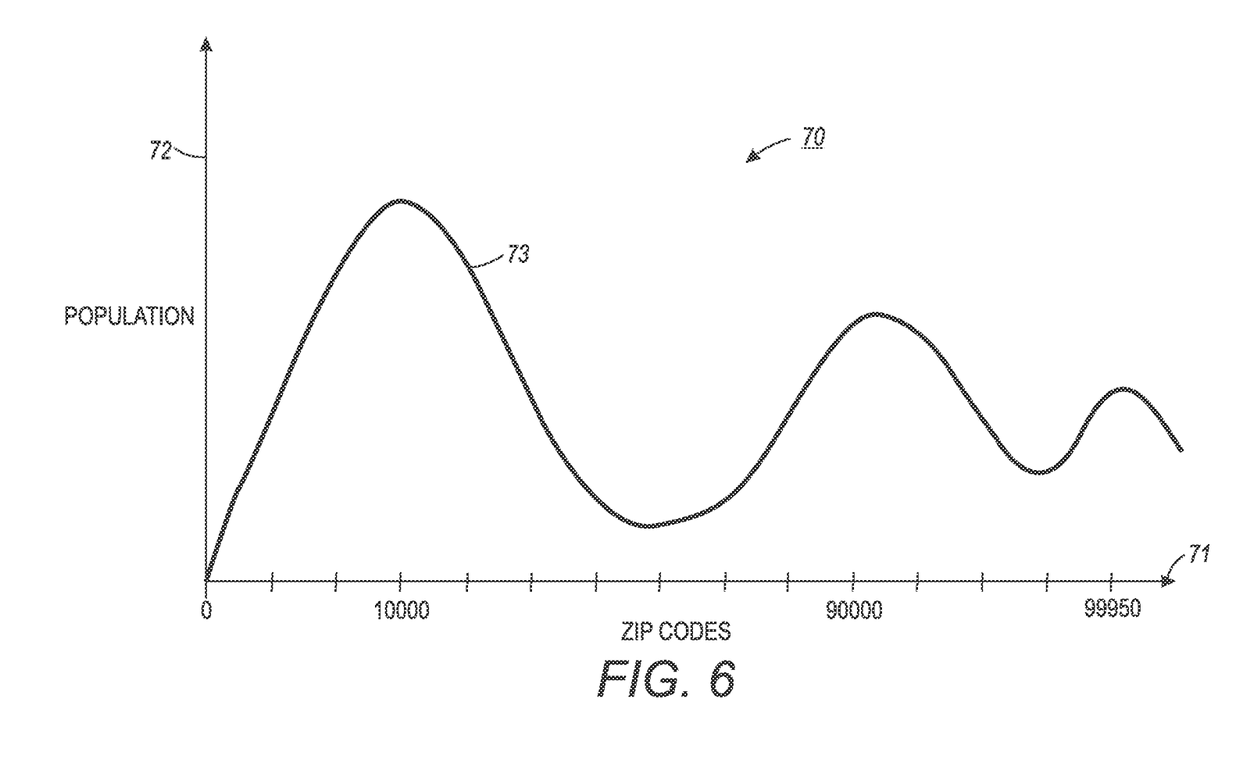
FIG. 6 is a block diagram showing, by way of example, a graph for a distribution of zip codes in a dataset.

In one example, using statistics-based classification, an encrypted attribute is selected from the dataset for mapping and comparison with the PDFs. FIG. 6 is a block diagram showing, by way of example, a graph 70 for a distribution of zip codes in a dataset. An x-axis 71 of the graph represents the zip codes included in the dataset from the data owner, while the y-axis 72 represents a frequency of each zip code. Specifically, the frequency is determined based on a number of data values in the dataset that represent one such zip code. A function 73 for the zip code distribution of the dataset is mapped within the axes. The function 73 includes crests around the 10000 zip code range, around the 90000 range, and around the 95000 range. Further, the function includes troughs around the 50000 and 60000 zip code ranges. The distribution is then compared with each of the known PDFs and a measure of divergence is determined. A threshold is applied to each of the divergence measures and a threshold is applied to determine the known PDF with a divergence measure that satisfies the threshold. The encrypted attribute is then identified as the attribute of the known PDF and the sensitivity level associated with the known PDF is assigned to the identified attribute.

Figure 7:
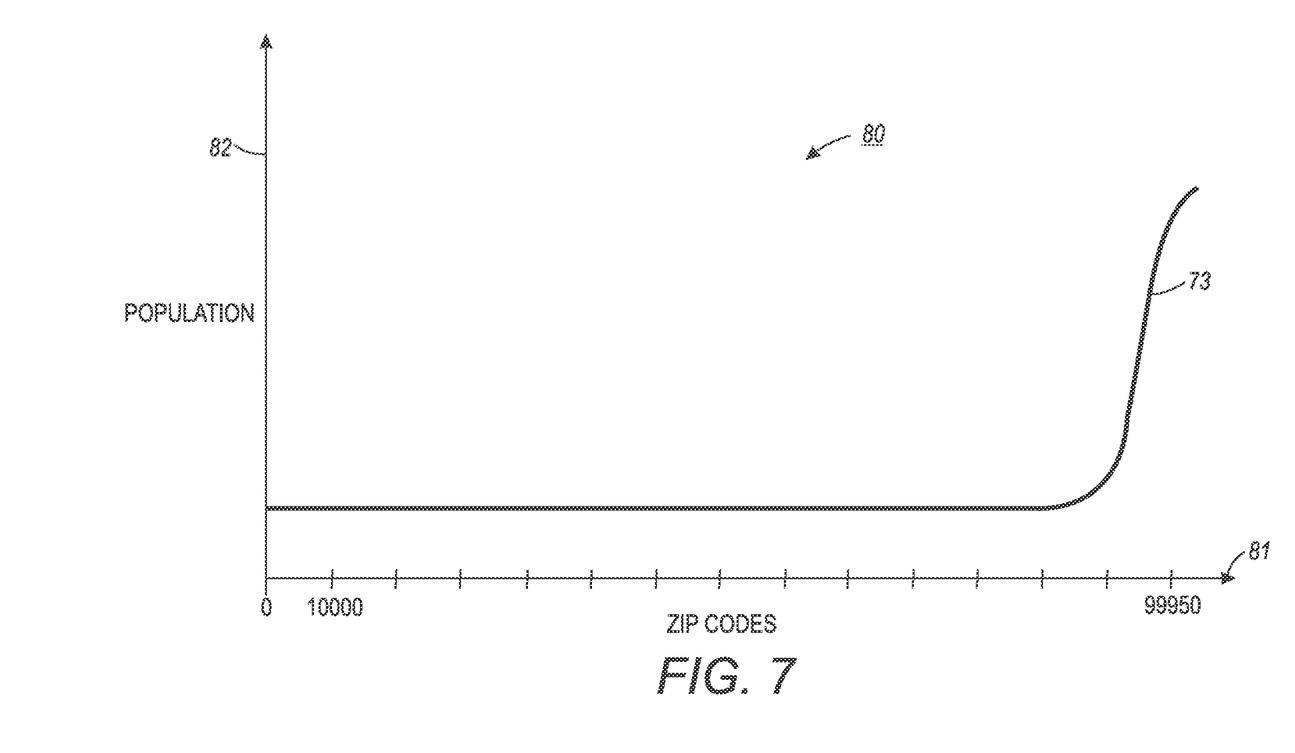
FIG. 7 is a block diagram showing, by way of example, a graph for a different distribution of zip codes in a dataset.

Alternatively, when the attribute is already known, the comparison can be used to determine a level of anonymization for the data values of that attribute. For instance, FIG. 7 is a block diagram showing, by way of example, a graph 80 for a different distribution of zip codes in a dataset. An x-axis 81 of the graph represents the zip codes included in the dataset from the data owner, while the y-axis 82 represents a frequency of each zip code. The frequency is determined based on a number of data values in the dataset that represent one such zip code. A function 83 for the zip code distribution of the dataset is mapped within the axes. Specifically, in this case, the dataset includes mostly zip codes along the West Coast, as represented by growth of the curve beginning at around the 90000 zip code. Thus, the dataset includes only a portion of the zip codes represented by the PDF, which is shown by the different representation of the attribute values for zip code in the dataset.

Based on the comparison of the representations, the anonymizer can determine an anonymization level. For instance, in this example, the known PDF for zip code can be associated with a sensitivity value of 0.4, indicating that a low level of anonymization is required. However, since the dataset represents a smaller set of values for the zip code attribute, which is concentrated on the West Coast, a higher level of anonymization can be required since the data is revealing information about a smaller group of individuals that all reside along the West Coast versus across the entire country, such as shown by the known PDF for zip code. The sensitivity level can be assigned based on prior experience of the anonymizer or based on a range of zip codes. For instance, the anonymizer can use prior experience in anonymizing zip codes by determining whether zip codes focused on the West Coast have been previously anonymized, and if so, at what level of anonymization. The anonymization level can then be assigned to the zip code attribute of the dataset.

Alternatively, a range of zip codes can be used to determine a sensitivity value and thus, level of anonymization. In one embodiment, the range is based on a number of zip codes. For example, 1-25 different zip codes provided in the dataset may be associated with a high sensitivity value, since determining an individual's identity is easier within a particular area than within the entire country. Further, 26-100 different zip codes may be associated with a medium sensitivity level, and 100 or more different zip codes can be associated with a low sensitivity level or with the sensitivity level associated with the PDF for that attribute.

Additionally, two or more attributes can be mapped together as a joint distribution. For example, age and medical condition can be mapped for a dataset. A known PDF for the joint distribution can be accessed, if available, and compared with the mapped distribution from the dataset. A difference in the distribution may be identified, which suggests that a unique property exists in the dataset values that is making the mapped distribution of the dataset values differ from the PDF. The difference can occur due to the values of the dataset being limited to a certain geographical location, as provided in the example described with respect to FIG. 7, demographic group, or age group. The sensitivity level and corresponding level of anonymization is then determined based on the difference. For instance, a higher than average level of sensitivity can be assigned to the attribute from which the data values are limited to prevent disclosure of the individuals associated with those values.

Further, the mapped representations of the dataset attributes can be used to determine a sensitivity level for another one of the attributes that is highly correlated. For instance, a first attribute from the dataset is already associated with a sensitivity value. A mapping of the first attribute is compared to the mappings of the other attributes in the dataset to determine whether another attribute in the dataset is so closely correlated that the data values of the first attribute and the correlated attribute should be similarly anonymized. Specifically, the distributions of the attributes are compared and a measure of divergence is determined. A predetermined threshold is applied and if the divergence measure is below the threshold, the two attributes from the dataset are determined to be matching and the known sensitivity level is assigned to the matching attribute. An example of two highly correlated attributes can include country and zip code.

Once the attributes are identified and a sensitivity level has been assigned, the attributes selected for anonymization can be provided with sensitivity levels or anonymization levels to the data owner for review and confirmation. However, prior to or after feedback from the data owner, the attributes for anonymization can be verified using plaintext sampling. Further, plaintext sampling can also be used identify attributes for anonymization in lieu of rule-based classification or statistics-based classification.

Figure 8:
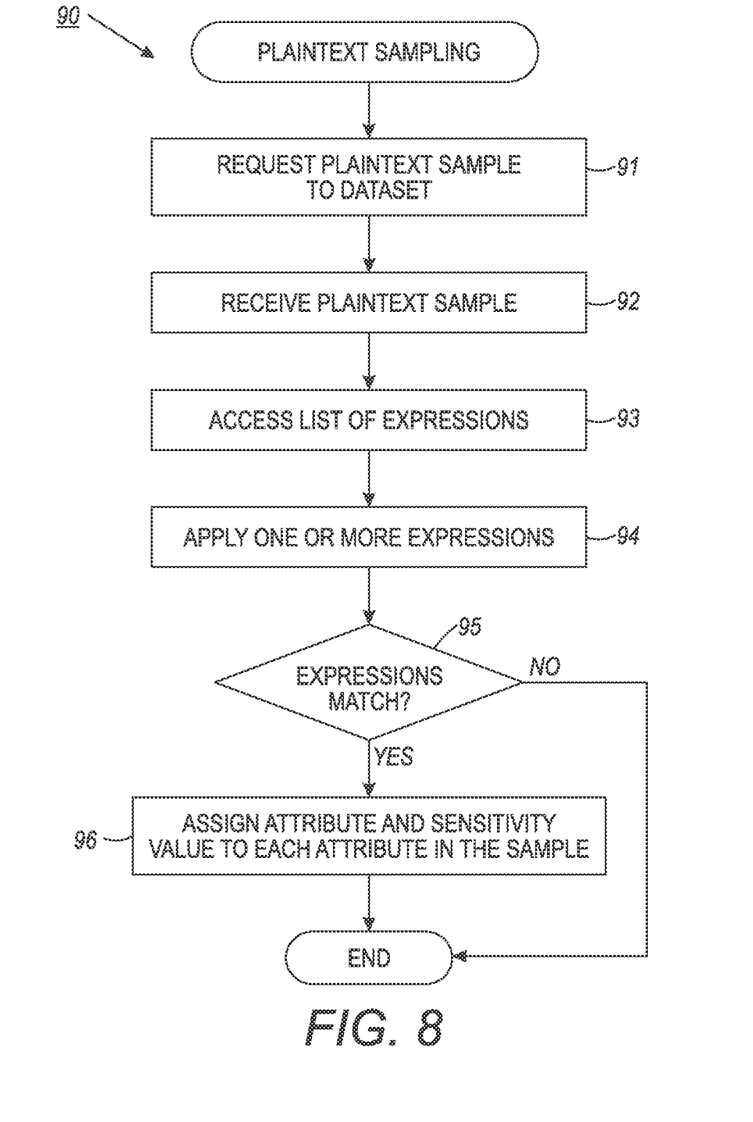
FIG. 8 is a flow diagram showing, by way of example, a process for plaintext sampling.

Plaintext sampling includes utilizing a known sample from a dataset to be analyzed. FIG. 8 is a flow diagram showing, by way of example, a process 90 for plaintext sampling. The anonymizer transmits (block 91) a request to a data owner for a plaintext sample of a dataset to be analyzed. The sample can include a portion of the data values in the dataset. In one embodiment, a predetermined number of data values for each attribute can be provided as the sample. Alternatively, a predetermined number of data values or a predetermined portion of the data values, such as 1%, can be provided randomly from the dataset. Further yet, the data owner can determine a size of the sample and which data values to provide as the sample.

In response to the request, the data owner provides (block 92) the anonymizer with the sample. In one embodiment, the complete dataset in encrypted form can also be provided with the plaintext sample. Prior to, concurrently with, or after receipt of the sample, the anonymizer can access (block 93) a list of expressions. The expression list can include at least one pattern for each attribute and a sensitivity value associated with each pattern. For instance, an expression for social security number can include three spaces followed by a dash, followed by two spaces, followed by another dash, followed by four spaces. The spaces can each represent a numerical value from zero to nine. Meanwhile, a pattern for age can include a range of one to three spaces, and a pattern for vehicle license plate can include a specific series of numbers and letters. For instance, older Washington state license plates include three numbers followed by a dash, followed by three letters, while newer license plates include seven characters, beginning with a number, followed by a letter, followed by two numbers, followed by three letters. In yet a further example, an expression for two capital letters can represent a state. The expressions can be generated by the anonymizer based on prior experience of the anonymizer in identifying and classifying attribute data values.

Each data value in the plaintext sample is compared (block 94) with the expressions and a determination (block 95) is made as to whether that data value matches one of the expressions. When the plaintext sampling is used to verify the attributes, such as after statistics-based classification has been performed, an identified match can confirm or contradict a previous classification of the attribute. For instance, the attribute for the data value 98125 has been identified as zip code, using statistics-based classification. The data value is then provided as part of the plaintext sample and compared with a list of expressions. The expression for zip code can include five numbers between zero and nine and is determined to match the data value of 98125. Based on the match, the data value is considered to belong (block 96) to the zip code attribute, which matches the previous assignment of the attribute as zip code using statistics-based classification. Further, the sensitivity value associated with the expression can then be assigned to the data value. The sensitivity value can be the same or different than the sensitivity value assigned during statistics-based classification. However, if no match is made, the data value is not identified or classified as belonging to the attribute for the compared expression. Further, if no match is made, the data value can be considered as not sensitive.

The processed sample can then be used to further process the encrypted data values of the dataset. Specifically, one of the processed data values is selected from the sample and the group or attribute, of the dataset, to which the processed data value belongs is identified. The attribute and associated sensitivity value assigned to the plaintext data value are then assigned to each of the data values in the same group or attribute for the dataset to identify those attributes, including corresponding data values, for anonymization and the levels of anonymization.

In a further embodiment, if the plaintext sampling is used to identify attributes for anonymization, in lieu of rule-based classification and statistics-based classification, a match between a plaintext data value and an expression can be used to classify the attribute of the plaintext data value. For example, a plaintext data value matches an expression for license plate and thus, the attribute to which the data value belongs is identified as license plate. Additionally, all the encrypted data values associated with the attribute can also be identified as being a license plate number. The sensitivity value associated with the license plate is assigned to the data value and can be used to determine whether the data value should be anonymized and if so, at what level, as described above. However, if no expression is determined to match the data value, the data value can be classified as not sensitive and thus, no anonymization is necessary.

As described above, the sample, once processed, is used to assign sensitivity values to the encrypted data values from the dataset for determining which data values should be anonymized. For instance, one of the processed data values is selected from the sample, and the group or attribute, of the dataset, to which the processed data value belongs is identified. The attribute and associated sensitivity value assigned to the processed plaintext data value are then assigned to each of the data values in the same group or attribute for the dataset to identify those attributes, including corresponding data values, for anonymization and the levels of anonymization.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for automatically identifying attributes for anonymization, comprising:
    a database to store a dataset of attributes, wherein each attribute is associated with a plurality of values; and
    a server comprising a central processing unit, memory, an input port to receive the attributes, and an output port, wherein the central processing unit is configured to:
    encrypt the values of the dataset;
    process the attributes by assigning a sensitivity level to each of the attributes;
    select one or more of the attributes from the dataset for anonymization based on the assigned sensitivity levels; and
    determine a level of anonymization for each of the attributes based on the assigned sensitivity level by applying the sensitivity level of each attribute to two or more ranges of sensitivity levels, wherein each of the ranges is associated with a level of anonymization, identifying for each dataset attribute, the range in which the sensitivity level is included, and assigning the level of anonymization for the identified range to that dataset attribute.

2. A system according to claim 1, wherein the central processing unit identifies the selected attributes for anonymization by applying a predetermined threshold to the sensitivity level of each attribute and by designating those attributes with sensitivity levels that satisfy the predetermined threshold as the selected attributes for anonymization.

3. A system according to claim 1, wherein the central processing unit determines the sensitivity levels by comparing the attributes with a dictionary of known attributes, which are each associated with a sensitivity level, identifying a match of a known attribute in the dictionary for at least one of the attributes, and designating the sensitivity level of the matching known attribute to the at least one attribute.

4. A system according to claim 3, wherein the central processing unit performs the comparison of the attributes in the dataset with the dictionary of attributes by determining whether one of the attributes in the dataset appears in one of the known attributes or whether one of the known attributes appears in the attribute of the dataset and identifying a match when one of the attributes in the dataset appears in one of the known attributes or when one of the known attributes appears in the attribute of the dataset.

5. A system according to claim 3, wherein the central processing unit performs the comparison of the attributes in the dataset with the dictionary of attributes by defining a vector for each of the known attributes in the dictionary, defining a vector for one of the attributes in the dataset, comparing the vector for the dataset attribute with the vectors for each of the known attributes, computing a measure of similarity for each comparison, and identifying a match for the dataset attribute by selecting the known attribute that satisfies a predetermined threshold of similarity.

6. A system according to claim 1, wherein the central processing unit determines the sensitivity level for each dataset attribute by comparing the dataset attribute with distribution models for known attributes, wherein each model is associated with a sensitivity level for that known attribute, generating a model of the dataset attribute based on the encrypted values, identifying one of the models to which the dataset attribute is most closely related as a match, and assigning the sensitivity value of the matching model to the dataset attribute.

7. A system according to claim 1, wherein the central processing unit determines the sensitivity level for each dataset attribute by maintaining expressions for known attributes, comparing the dataset attribute to the expressions for the known attributes, identifying at least one of the expressions for the known attributes that matches the dataset attribute, and assigning the sensitivity value of the known attribute to the dataset attribute.

8. A system according to claim 1, wherein the central processing unit provides the one or more attributes selected for anonymization to a user, receives feedback from the user for at least one of the attributes selected for anonymization, wherein the feedback comprises one of confirming or denying the attribute, or adding a further attribute to the list of attributes to be anonymized, and revises the one or more attributes selected for anonymization based on the feedback from the user.

9. A computer-implemented method for automatically identifying attributes for anonymization, comprising:
   accessing a dataset of attributes, wherein each attribute is associated with a plurality of values;
   encrypting the values of the dataset via a server comprising a central processing unit, memory, an input port to receive the attributes, and an output port;
   processing via the server the attributes by assigning a sensitivity level to each of the attributes;
   selecting one or more of the attributes from the dataset for anonymization based on the assigned sensitivity levels via the server; and
   determining via the server a level of anonymization for each of the attributes based on the assigned sensitivity level, comprising:
      applying the sensitivity level of each attribute to two or more ranges of sensitivity levels, wherein each of the ranges is associated with a level of anonymization;
      identifying for each dataset attribute, the range in which the sensitivity level is included; and
      assigning the level of anonymization for the identified range to that dataset attribute.

10. A method according to claim 9, further comprising:
   identifying those attributes for anonymization, comprising:
      applying a predetermined threshold to the sensitivity level of each attribute; and
      designating those attributes with sensitivity levels that satisfy the predetermined threshold as the selected attributes for anonymization.

11. A method according to claim 9, further comprising:
   determining the sensitivity levels, comprising:
      comparing the attributes with a dictionary of known attributes, which are each associated with a sensitivity level;
      identifying a match of a known attribute in the dictionary for at least one of the attributes; and
      designating the sensitivity level of the matching known attribute to the at least one attribute.

12. A method according to claim 11, further comprising:
   performing the comparison of the attributes in the dataset with the dictionary of attributes, comprising:
      determining whether one of the attributes in the dataset appears in one of the known attributes or whether one of the known attributes appears in the attribute of the dataset; and
      identifying a match when one of the attributes in the dataset appears in one of the known attributes or when one of the known attributes appears in the attribute of the dataset.

13. A method according to claim 11, further comprising:
   performing the comparison of the attributes in the dataset with the dictionary of attributes, comprising:
      defining a vector for each of the known attributes in the dictionary;
      defining a vector for one of the attributes in the dataset;
      comparing the vector for the dataset attribute with the vectors for each of the known attributes;
      computing a measure of similarity for each comparison; and
      identifying a match for the dataset attribute by selecting the known attribute that satisfies a predetermined threshold of similarity.

14. A method according to claim 9, further comprising:
   determining the sensitivity level for each dataset attribute, comprising:
      comparing the dataset attribute with distribution models for known attributes, wherein each model is associated with a sensitivity level for that known attribute;
      generating a model of the dataset attribute based on the encrypted values;
      identifying one of the models to which the dataset attribute is most closely related as a match; and
      assigning the sensitivity value of the matching model to the dataset attribute.

15. A method according to claim 9, further comprising:
   determining the sensitivity level for each dataset attribute, comprising:
      maintaining expressions for known attributes;
      comparing the dataset attribute to the expressions for the known attributes;
      identifying at least one of the expressions for the known attributes that matches the dataset attribute; and
      assigning the sensitivity value of the known attribute to the dataset attribute.

16. A method according to claim 9, further comprising:
   providing the one or more attributes selected for anonymization to a user;
   receiving feedback from the user for at least one of the attributes comprising one of confirming or denying the attribute, or adding a further attribute to the list of attributes to be anonymized; and
   revising the one or more attributes selected for anonymization based on the feedback from the user.

\* \* \* \* \*